United States Patent
Kasama et al.

[15] 3,659,119
[45] Apr. 25, 1972

[54] THYRISTOR CHOPPER CONTROLLING CIRCUIT

[72] Inventors: Ryoji Kasama; Sigeru Kuriyama, both of Katsuta, Japan

[73] Assignee: Hitachi, Ltd., Tokyo, Japan

[22] Filed: Mar. 19, 1971

[21] Appl. No.: 125,941

[30] Foreign Application Priority Data

Mar. 20, 1970 Japan..................................45/23037

[52] U.S. Cl. ..........................307/252 M, 321/43, 321/45 C
[51] Int. Cl. .......................................................H03k 17/00
[58] Field of Search ............307/252 J, 252 M; 321/43, 45 C

[56] References Cited

UNITED STATES PATENTS

| | | | |
|---|---|---|---|
| 3,150,307 | 9/1964 | Kaeding | 307/252 M |
| 3,365,640 | 1/1968 | Gurwicz | 307/252 M |

*Primary Examiner*—John Zazworsky
*Attorney*—Craig, Antonelli & Hill

[57] ABSTRACT

A circuit arrangement for controlling a thyristor chopper which extinguishes a main thyristor by discharging the charge stored in a capacitor to the main thyristor at a predetermined instance in the opposite polarity, comprising means for detecting the terminal voltage of said capacitor and calculating the maximum ability for extinguishing the main thyristor and means for detecting the load current of the chopper, thereby enabling the extinction of the thyristor in the extinguishing ability of the capacitor.

4 Claims, 2 Drawing Figures

INVENTORS
RYOJI KASAMA AND
SIGERU KURIYAMA

BY Craig, Antonelli, Stewart + Hill
ATTORNEYS 3,659,119

THYRISTOR CHOPPER CONTROLLING CIRCUIT

BACKGROUND OF THE INVENTION

1. Field of the Invention

This invention relates to a thyristor chopper controlling circuit and more particularly to a circuit for controlling a thyristor chopper including an extinguishing capacitor.

2. Description of the Prior Art

In a conventionally known chopper circuit, a main thyristor is connected in series with a load and a series connection of a capacitor and a reactor for extinguishing the thyristor is connected in parallel to the main thyristor. To extinguish the main thyristor, the charge stored in the capacitor is discharged through the reactor by an auxiliary thyristor, the oscillating current generated thereupon extinguishing the main thyristor. There have been proposed many other methods in which a main thyristor is extinguished by the charge of a capacitor. In any of these methods, however, the charge of the capacitor should be large enough to cancel the forward current of the main thyristor to extinguish the main thyristor. Generally, such a capacitor is designed to be charged through a resistor from a voltage source common with that for a load, etc. and to have charge sufficient to extinguish the predetermined load current under a predetermined source voltage.

In the case of supplying electric power from a source of very large voltage variation, when the load current is large and the source voltage is lowered, the charge stored in the extinguishing capacitor may be insufficient to extinguish the main thyristor. In such a case, the thyristor chopper circuit cannot chop the thyristor and it therefor loses its function. In ordinary design, the capacitance of the extinguishing capacitor is so selected that the capacitor can extinguish the main thyristor at full load current even when the source voltage is subjected to a decrease of about 20 percent. If the capacitance of the extinguishing capacitor is raised to have much tolerance in energy storage, it can endure larger variations in the source voltage. Such an increase in the capacitance of the capacitor is not desirable because it leads to an increase of the manufacturing cost of the thyristor chopper. Particularly, in the case of using a battery as the voltage source, when a large current is derived from a run-down battery, the terminal voltage of the buttery may decrease below 50 percent of the rated value. To prepare a capacitor which can store sufficient energy for extinguishing the main thyristor even under such a condition results in a high cost since such a case is rare.

SUMMARY OF THE INVENTION

An object of this invention is to provide a thyristor chopper controlling circuit which can positively extinguish the thyristor.

Another object of this invention is to reduce the manufacturing cost of a thyristor chopper circuit by controlling the load current based on the extinguishing ability of the thyristor chopper circuit.

A further object of this invention is to provide a thyristor chopper controlling circuit adapted for controlling the load which uses a battery as the voltage source.

According to one feature of this invention, a current limiting circuit is provided for controlling the operation of a thyristor chopper circuit by detecting the load current lest the thyristor chopper circuit goes into an over-loaded state, and the detection signal of the energy stored in the extinguishing capacitor is supplied to this current limiting circuit to vary the limit standard of the operation of the thyristor chopper circuit for the load current.

DETAILED DESCRIPTION OF THE PREFERRED EMBODIMENT

Figure 1:
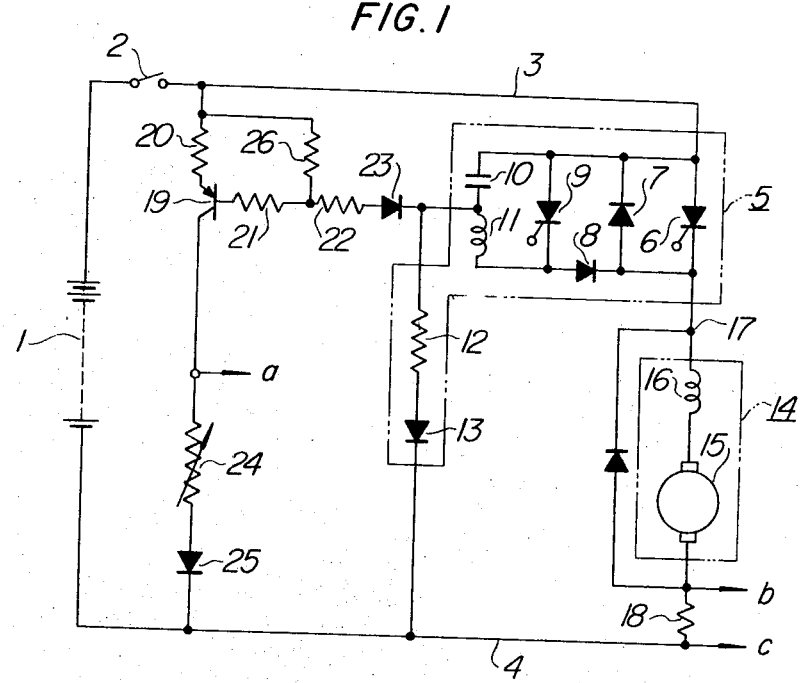
FIG. 1 is an electric connection diagram of the main circuit of an embodiment of the invention.

FIG. 1 shows a main circuit including means for detecting the stored energy of an inverting capacitor, in which a D.C. source supplies a source voltage between lines 3 and 4 through a main switch 2.

A thyristor chopper circuit 5 comprises a main thyristor 6, a diode 7 parallelly connected in reverse direction, an auxiliary inverting thyristor 9 parallelly connected in forward direction through a diode 8, a series connection of an inverting capacitor 10 and a reactor 11 which is connected in parallel to the auxiliary thyristor 9, and a series connection of a resistor 12 and a diode 13 which forms a charging circuit for the capacitor 10.

A load motor 14 comprises an armature 15 and a series winding 16, one end of the motor being connected to the output terminal 17 of the thyristor chopper circuit 5 and the other end to the voltage source line 4 through a current detecting resistor 18. A PNP type transistor 19 has an emitter connected to the voltage source line 3 through a resistor 20, a base connected to the interconnection of the capacitor 10 and the reactor 11 in the thyristor chopper circuit 5 through resistors 21, 22 and a diode 23, and a collector connected to the voltage line 4 through a variable resistor 24 and a diode 25 with an output terminal $a$ provided at the anti-voltage line 4 side of the resistor 24, and a by-pass resistor 26 connected between the voltage line 3 and the interconnection of the resistors 21 and 22, for converting the energy stored in the inverting capacitor 10 into a controlling signal.

In such a main circuit, the voltage lines 3 and 4 are energized by closing the main switch 2. The main thyristor 6 in the thyristor chopper circuit 5 may be fired by triggering the gate of the main thyristor to energize the load motor 14. After a certain length of time, the auxiliary thyristor 19 may be fired by triggering the gate of the auxiliary thyristor 9 to discharge the charge stored in the capacitor 10 to the reactor 11. An oscillating current is generated by this discharge which inverts (i.e., extinguishes) the main and the auxiliary thyristors 6 and 9.

Thus, the load current flowing through the motor 14 may be controlled by alternately triggering the thyristors 6 and 9 and controlling the period of the trigger.

In the transistor 19, a forward voltage related to the terminal voltage of the inverting capacitor 10 is applied between the emitter and the base. Arranging the base current due to said emitter-base voltage kept in the unsaturated region of the transistor 19, and output voltage $Va$ corresponding to the energy stored in the inverting capacitor 10 can be obtained at the output terminal $a$ of the resistor 24.

Further, an output voltage $Vb$ related to the product of said stored energy and the current flowing through the motor 14 is generated at the output terminal $b$ of the resistor 18 connected in series to the motor 14.

Figure 2:
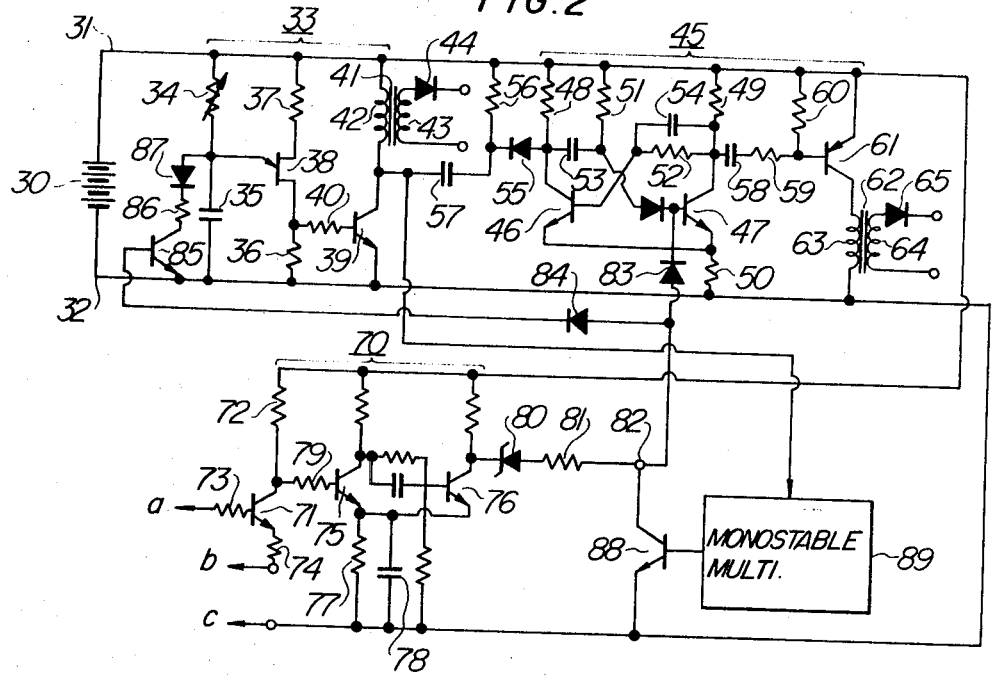
FIG. 2 is an electric connection diagram of the supplementary circuit of the embodiment.

In the supplementary circuit of FIG. 2, a voltage source 30 for the supplementary circuit supplies a voltage to voltage lines 31 and 32, but may be dispensed with by utilizing the source 1 of the main circuit. A gating pulse generating circuit 33 for firing the thyristor chopper circuit 5 essentially comprises a series connection of a variable resistor 34 connected between voltage lines 31 and 32 and a capacitor 35, and a unijunction transistor 38 having both bases connected to lines 31 and 32 through resistors 36 and 37 respectively and an emitter connected to the terminal of said capacitor 35 on the variable resistor 34 side. An amplifying NPN type transistor 39 has an emitter connected to the line 32, a base to the output side base of the unijunction transistor 38 through a resistor 40, and a collector to the line 31 through the primary winding 42 of a pulse transformer 41. The secondary winding 43 of this pulse transformer 41 is connected to the gate and cathode of the main thyristor 6 of the thyristor chopper circuit 5 through a diode 44. A gating pulse generating circuit 45 for inverting the thyristor chopper circuit 5 essentially comprises a monostable multivibrator circuit including NPN type transistors 46 and 47 connected between lines 31 and 32, collector resistors 48 and 49, an emitter resistor 50, base resistors 51 and 52, and coupling capacitors 53 and 54. The collector of the normally open transistor 46 is connected to the collector of said transistor 39 through a differentiating circuit including a diode 55, a resistor 56 and a capacitor 57. A differentiating circuit comprising a capacitor 58 and resistors 59 and 60 is connected between the collector of the normally closed transistor 47 and the line 31 to supply a differentiated output to the base of a PNP type transistor 61. The emitter of this transistor is connected to the line 31 and the collector to the line 32 through the primary winding 63 of a pulse transformer 62. The secondary winding 64 of this transformer is connected between the gate and the cathode of the auxiliary thyristor 9 in the thyristor chopper circuit 5 through a diode 65.

In such gating pulse generating circuits 33 and 45, when the variable resistor 34 is manipulated to vary the charging time constant of the capacitor 35, there is caused a variation in the period with which the charged voltage of the capacitor 35 makes the unijunction transistor 38 conductive. The signal from this transistor 38 is shaped by the transistor 39 and the pulse transformer 41 and then varies the firing period of the main thyristor 6 in the thyristor chopper circuit 5. The metastable period of the monostable multivibrator which is excited based on the variation in the collector voltage of the transistor is constant. Therefore, when a constant time period elapses after the firing of the main thyristor 6, the auxiliary thyristor 9 is fired and inverted by utilizing the energy stored in the capacitor 10.

Thus, the average of the load current in unit time may be controlled by altering the firing period of the main thyristor 6 by the variable resistor 34.

Next, the limitation of the load current will be described. In FIG. 2, numeral 70 indicates a current limit setting circuit in which the collector of an NPN type transistor 71 is connected to the line 31 through a resistor 72, the base to the output terminal $a$ of the resistor 24 (FIG. 1) through a resistor 73, the emitter to the output terminal $b$ of the current detecting resistor 18 through a resistor 74, and the terminal $c$ of the line 32 is connected in common with the terminal $c$ of the line 4. In a Schmidt circuit comprising NPN type transistors 75 and 76, a capacitor 78 is connected in parallel with an emitter resistor 77 to stabilize the output against electrical noise and the base of the input side transistor 75 is connected to the collector of said transistor 71 through a resistor 79. The collector of the output side transistor 76 is connected to an output terminal 82 through a Zener diode 80 and a resistor 81. This output terminal 82 is connected to the base of an NPN type transistor 85 through a diode 84 as well as to the base of the normally closed transistor 47 in the monostable multivibrator through a diode 83. The emitter of this transistor 85 is connected to the line 32 and the collector to the emitter of the unijunction transistor 38 through a resistor 86 and a diode 87.

An NPN type transistor 88 is connected between the output terminal 82 and the source line 32 with its base connected in such a manner that the transistor becomes conductive by the metastable state of a monostable multivibrator 89 which is excited by the collector voltage of the transistor 39 in the gating pulse generating circuit 33.

In the above structure, the voltage given to the base of the transistor 71 is a forward voltage proportionally related to the terminal voltage (stored energy) of the inverting capacitor 10 in the thyristor chopper circuit 5, and the emitter voltage is a reverse voltage proportionally related to the voltage drop at the current detecting resistor 18 by the load current. The collector voltage of the transistor 71 controlled by the above two voltages is level-detected at the Schmidt circuit comprising the transistors 75 and 76. When the level exceeds above the set value, the transistor 76 becomes nonconductive to raise the collector voltage, thereby generating a voltage at the output terminal 82 through the Zener diode 80 and the resistor 81. The voltage at this output terminal 82 forces the transistor 47 conductive through the diode 83 to generate an inverting gate pulse. At the same time, said voltage forwardly biases the transistor 85 through the diode 84 to make it conductive and leads the gate pulse generating circuit 33 to a resting state.

However, if said operation (forcing back to the stable state) is achieved immediately after the monostable multivibrator circuit in the gate pulse generating circuit 45 becomes metastable, the transistor 61 cannot be set fully conductive because of insufficient discharge of the capacitor 58, therefore a sufficient inverting gate pulse cannot be generated. To prevent this, the transistor 88 is set conductive for a certain period of time (about 0.2 m sec in the embodiment) by the monostable multivibrator 89 which is excited by the voltage variation on the turning on of the transistor 39, to short-circuit the output terminal 82.

If the transistor 71 in the current limit setting circuit 70 is in the unsaturated region, the collector voltage of the transistor 71 is in inverse proportion to the energy stored in the inverting capacitor 10 in the thyristor chopper circuit 5 and in proportion to the load current. Thus, setting the load current which causes a voltage drop corresponding to the collector voltage at which the Schmidt circuit operates with reference to the electric energy stored in the inverting capacitor 10 when the source voltage is normal as the invertable limit value, the invertable limit value of the load current decreases when the source voltage decreases to decrease the energy stored in the capacitor 10, and the Schmidt circuit operates at this reduced value.

Further, putting the maximum of the load current in the normal state equivalent to the maximum current capacity of the semiconductor element used in the thyristor chopper circuit 5, such a current limitation can also prevent damage to the semiconductor element due to an excessive current. Thus, a semiconductor element can effectively be utilized near the maximum of its capacity.

The energy stored in the inverting capacitor 10 may also be detected by detecting the voltage between the source voltage lines 3 and 4 without any practical problem. Namely, the circuit constants are often so selected that the inverting capacitor 10 is completely charged to the source voltage in each period in the chopping operation of the thyristor chopper circuit 5. In such a case, the energy stored in the capacitor 10 is proportional relation to the voltage between the source lines 3 and 4. Thus, it becomes possible to control the set value of the current limit setting circuit 70 by detecting the voltage between the source lines. Such a control may be achieved by short-circuiting the emitter and the collector of the transistor 19 (by omitting the transistor 19) in the main circuit of FIG. 1.

It should be noted that the thyristor chopper circuit described in the above embodiment is only an example and that the present invention can be applied to any system provided that it inverts utilizing the energy stored in a capacitor.

Further, the gate pulse generating circuit in the supplementary circuit may be modified or altered according to necessity: two output states of an astable multivibrator may be employed. The Schmidt circuit for discriminating the current limitation may be replaced with many other level detectors.

As is described above, according to this invention, in a thyristor chopper circuit maximum load current is set while detecting the energy stored in an inverting capacitor and the thyristor chopper circuit is inverted at the thus set load current, enabling a safe use of a thyristor chopper circuit.

We claim:
1. A thyristor chopper controlling circuit comprising:
   a closed series connection comprising a D.C. source, a thyristor chopper circuit, and a load;
   a circuit for controlling said thyristor chopper circuit;
   a circuit for detecting the load current in said thyristor chopper circuit;
   a circuit for detecting the energy stored in an extinguishing capacitor in said thyristor chopper circuit; and a current limiting circuit receiving the outputs of the both of said detecting circuits and functioning on said circuit for controlling the thyristor chopper circuit so as to keep the load current within the extinguishing ability of said capacitor.

2. A thyristor chopper controlling circuit according to claim 1, in which said circuit for detecting the stored energy comprises a circuit for substantially detecting the terminal voltage of said capacitor.

3. A thyristor chopper controlling circuit according to claim 1, in which said circuit for detecting the stored energy comprises a circuit for detecting the source voltage.

4. A thyristor chopper controlling circuit according to claim 1, in which said current limiting circuit comprises a discriminating circuit for comparing the output of said load current detecting circuit with a predetermined standard value and acting on said thyristor chopper circuit to extinguish the thyristor chopper circuit when the load current reaches said predetermined value, and a circuit for modifying said predetermined value with the output of said circuit for detecting the stored energy.

* * * * *